US009831662B2

(12) United States Patent
Dawley et al.

(10) Patent No.: US 9,831,662 B2
(45) Date of Patent: Nov. 28, 2017

(54) POWER QUALITY DEVICE HAVING COMMUNICATION INTERFACE

(75) Inventors: Robert Dawley, Cary, NC (US); Dave Perrotta, Youngsville, NC (US)

(73) Assignee: Electronic Systems Protection, Zebulon, NC (US)

( * ) Notice: Subject to any disclaimer, the term of this patent is extended or adjusted under 35 U.S.C. 154(b) by 257 days.

(21) Appl. No.: 12/950,889

(22) Filed: Nov. 19, 2010

(65) Prior Publication Data

US 2012/0130658 A1    May 24, 2012

(51) Int. Cl.
| | |
|---|---|
| *G01R 21/06* | (2006.01) |
| *H02H 9/00* | (2006.01) |
| *H01R 13/66* | (2006.01) |
| *H02H 9/04* | (2006.01) |
| *H02H 1/00* | (2006.01) |
| *H02H 3/20* | (2006.01) |

(52) U.S. Cl.
CPC ............ *H02H 9/005* (2013.01); *H01R 13/66* (2013.01); *H02H 9/04* (2013.01); *H02H 1/0061* (2013.01); *H02H 3/207* (2013.01)

(58) Field of Classification Search
CPC ....................................... H02H 9/005
USPC ............................................. 702/62
See application file for complete search history.

(56) References Cited

U.S. PATENT DOCUMENTS

| | | | |
|---|---|---|---|
| 5,127,041 A * | 6/1992 | O'Sullivan | ............ H04M 11/06 379/93.05 |
| 5,611,055 A | 3/1997 | Krishan et al. | |
| 6,055,435 A | 4/2000 | Smith et al. | |
| 2002/0196805 A1* | 12/2002 | Brocco | ................. H04L 1/0006 370/442 |
| 2006/0271214 A1* | 11/2006 | Brown | ................. A61B 5/0002 700/90 |
| 2008/0118058 A1 | 5/2008 | Jakab | |
| 2010/0264739 A1 | 10/2010 | Errington | |

FOREIGN PATENT DOCUMENTS

WO    WO 2010057343 A2 *   5/2010

OTHER PUBLICATIONS

International Search Report dated Feb. 21, 2012 for PCT/US11/61514.

* cited by examiner

*Primary Examiner* — Hyun Park
(74) *Attorney, Agent, or Firm* — Edell, Shapiro & Finnan LLC

(57) ABSTRACT

Systems and methods provide power quality devices that have a dual use connector that will couple to a device being protected, such as a telephone handset, and will also provide a communication interface that a technician can access to establish communications with the power quality device.

8 Claims, 7 Drawing Sheets

POWER QUALITY DEVICE HAVING COMMUNICATION INTERFACE

FIELD OF INVENTION

The systems and methods described herein relate to power quality devices (i.e. surge protection devices (SPD) and power distribution units (PDU)) that are used to protect connected equipment from AC mains disturbances such as transients and EMI. In particular, the systems and methods relate to power quality devices that include a microcontroller or microprocessor and a serial communication interface (SCI) for connection of the power quality device to a computer. The SCI is typically used to transfer device status (i.e. outlet status) and recorded event history to the computer and to transfer device control parameters from computer to power quality device.

BACKGROUND

Power quality devices are, typically, designed to be as small as possible. Rack mounted devices, for instance, are typically restricted to one rack unit to occupy as little space in the equipment rack as possible. Cord connected devices are also limited in size as they are often placed or mounted in a restricted space behind the equipment that they are protecting.

SPDs and PDUs are usually designed to protect a system of equipment and, as such, usually contain several AC receptacles. In addition to the AC receptacles, cord connected devices also have an AC power cord, and may include a switch, over-current protection (i.e. panel mounted fuse or circuit breaker) diagnostic indicators and display. In addition to protecting connected equipment from AC mains transients and EMI, many SPDs and PDUs also include circuitry to protect connected equipment from telephone (modem/fax protection) and Ethernet transients. For each of these circuits a pair of connectors (i.e. modular jacks) is required; one for connection of device to wall outlet and the other for connection of device to protected equipment.

These small devices can be placed at the site of the equipment being protected and can protect the device, as well as collect information about the kinds of power events the device has detected. As information about AC mains transients and EMI can be valuable to in-field technicians, power device engineers have developed some power quality devices that include communication systems that allow the devices to interface with and communicate with a remote system. In this way, data about such transients and EMI events can be downloaded from the power quality device and viewed by the technician. Typically, the engineers have included serial communication interfaces that have some type of dedicated connector, typically a modular jack or a D-sub connector, that supports serial communications. Other devices employ optical communication systems that have an optical transducer for communicating data to a remote station. One such system is the Power Doctor II that is a hand held system that a technician can hold in front of the power quality device so that data can be delivered across an optical interface from the power quality device to the Power Doctor II. Data collected into the Power Doctor II can be downloaded through to a standard PC via a USB interface.

Although these power quality devices can work well and can communicate important data, there remains a need in the art for improved systems.

SUMMARY OF THE INVENTION

It is an object of the systems and methods described herein to provide power quality devices that have communication interfaces that are more facile for a servicing technician to access and use and that avoid adding to the size of the power quality device.

In one aspect the systems and methods described herein include power quality devices that have a dual use connector that will couple to a device being protected, such as a telephone handset, and will also provide a communication interface that a technician can access to establish communications with the power quality device. To this end, in one embodiment the systems described herein include power quality devices, that typically, but not always or exclusively, are small cord connected power protector devices that lay on the floor behind the equipment being protected and couple between a wall socket and the power cord of the equipment. These power quality devices are of the kind that protect connected equipment from AC mains transients and EMI, and that also include circuitry and the related connectors to connect to and protect telephone (modem/fax protection) equipment. The devices typically have a voltage sensor for detecting power events occurring on the electrical power line, and an event logger that logs and records an occurrence of a power event. Optionally the event logger logs the events against a time base, thereby allowing the events to be time-wise correlated to failures or performance problems with equipment coupled to the power source. Typically, the connectors include modular jacks, such as RJ 11 jacks. Such telephone jack connectors have six connector pins. A communication interface in the power quality device is capable of transferring the recorded events to a remote processor, where a technician or some other party can review the recorded data. The communication interface has a connection to two of the connector pins in the telephone jack connector, wherein the two connector pins are unused by the telephone equipment. A processor in the device transmits (and optionally) receives signals using the one or two of the connector pins as a hardware interface, and communicates the recorded data as two-line serial communication signals that can be processed by a remote device for transferring the recorded events.

In certain other optional embodiments, the power quality devices include a user interface that allows a user to set operating parameters of the power quality device that will select how the device responds to certain power conditions. In such embodiments, the communication interface includes a receiver for detecting and processing two-line serial communication signals on the two connector pins and for processing the signals to receive data from a remote source.

Optionally, the telephone jack connector is an RJ-11 connector and the two connector pins carry a receive line and a transmit line for a serial interface. Further optionally, the system may include a receiver for detecting and processing two-line serial communication signals on the two connector pins and for processing the signals to receive data from a remote source, as well as a clock coupled to the voltage sensor and capable of logging a clock count representative of the time lapsing since a previous logged event.

Further, the in-line power system of claim 1, may include a data polling process for interactively collecting data from the event logger and for transmitting collected data in real time.

Other objects of the invention will, in part, be obvious, and, in part, be shown from the following description of the systems and methods shown herein.

BRIEF DESCRIPTION OF THE DRAWINGS

The foregoing and other objects and advantages of the invention will be appreciated more fully from the following further description thereof, with reference to the accompanying drawings wherein.

DESCRIPTION OF THE ILLUSTRATED EMBODIMENTS

To provide an overall understanding of the invention, certain illustrative embodiments will now be described, including a cord connected power protection system that couples between an electric power source and a piece of equipment. The device will monitor power events and generate a locally stored log of such events. The device also includes a communication interface that has, in one embodiment, a dual use connector that will couple to a device being protected, such as a telephone handset, and will also provide a communication interface that a technician can access to establish communications with the power quality device. However, it will be understood by one of ordinary skill in the art that the systems and methods described herein can be adapted and modified for other suitable applications and that such other additions and modifications will not depart from the scope hereof.

Figure 1:
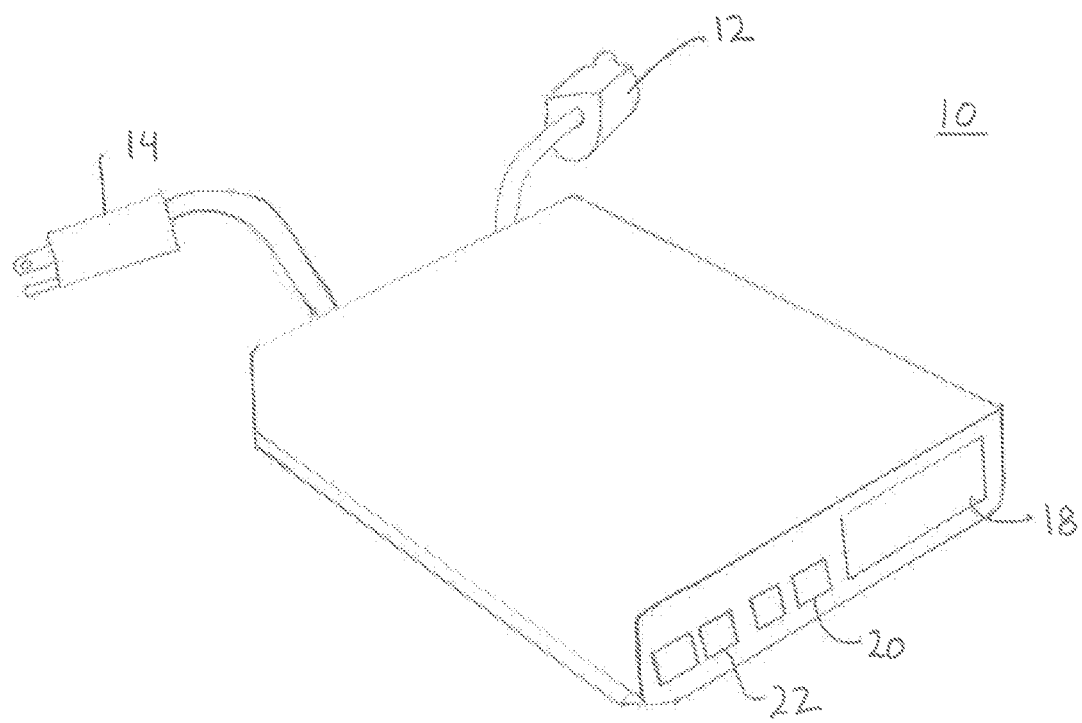
FIG. 1 depicts a cord connected power protection system according to the invention.

FIG. 1 depicts one example of a cord connected power protection device 10 that that monitors power events and generates a history log of power disturbance events. As depicted, the cord connected power protection device 10 is the type of device employed to protect equipment from phone, power, and network damage arising from power events, and to that end filters disruptive noise on AC power lines. Such power protection devices may be connected between a wall outlet and the device being protected, which for example may be a multifunction copier, printer, scanner, a server, kiosk, ATM and/or any networked equipment. Once connected the device 10 provides the equipment with a filtered power supply that can be safely disconnected from the equipment in response to a significant power event. The illustrated device 10 is a cord-connected hybrid filter (combination surge suppressor and filter) which suppresses power mains transients and EMI thereby protecting sensitive connected equipment. As can be seen from FIG. 1, a cord connected device is a device that connects into the power cord of the equipment so that the device is connected in-line with power supply. Typically, these devices are small enough so that they can fit beside or behind the equipment, often sitting on the floor and out of the way from the foot traffic to and from the equipment being protected. Thus, these devices are put in place and tucked aside, making them convenient for the office environment as they are readily installed and then positioned out of the way. Although convenient for the purpose of protecting the equipment, it is often inconvenient for the technician who needs to reach behind or around the equipment to access the device 10 and collect data from the device.

Figure 3:
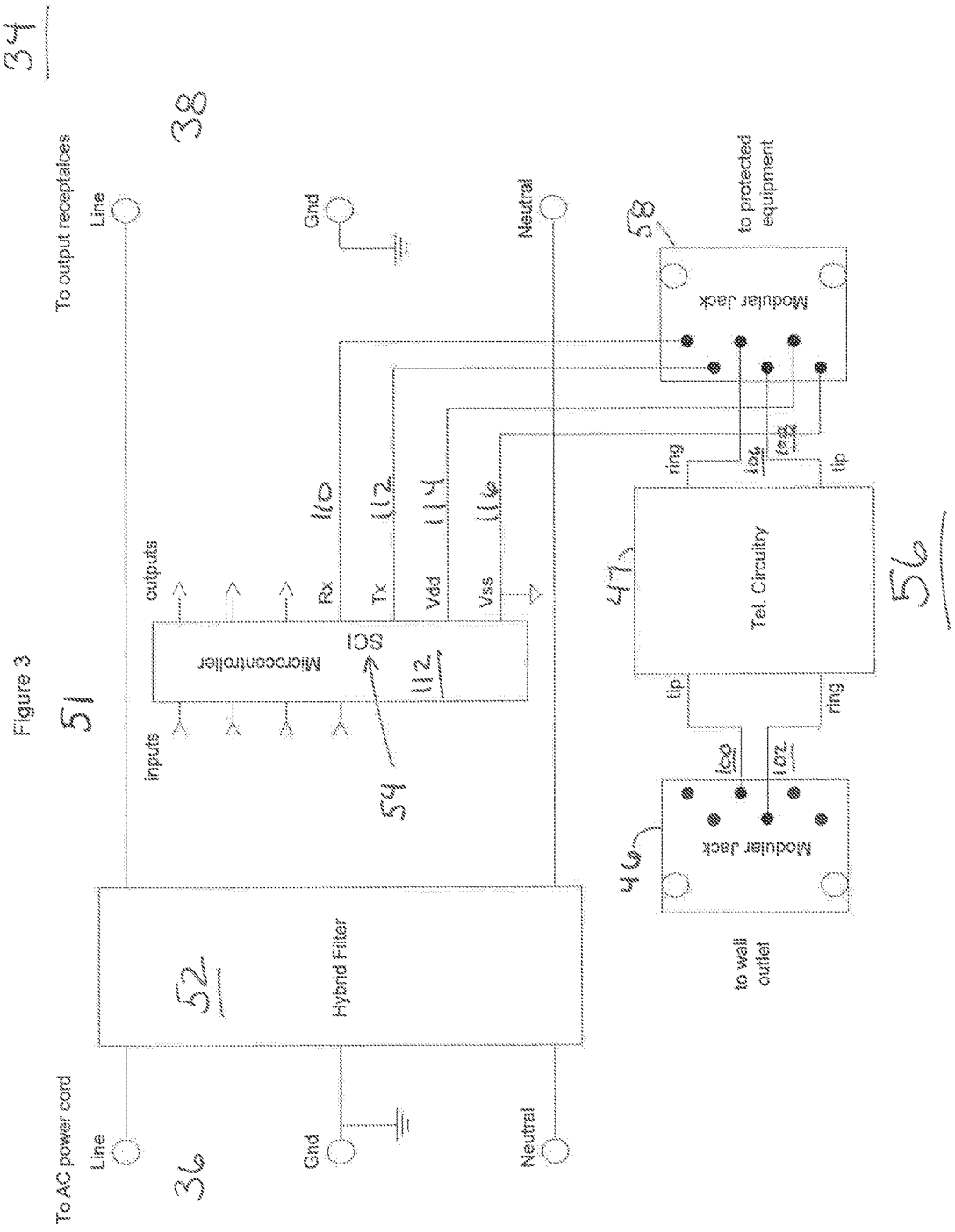
FIG. 3 depicts a functional block diagram of one cord connected power protection system having a communication interface.

The device 10 as shown in FIG. 3 includes a microcontroller and associated circuits which, among other things, are used to record the occurrence of various power quality disturbances (i.e. over voltage, under voltage, power outage and transient events). As will be explained with reference to FIG. 3, the microcontroller may contain or operate a serial communication interface which allows for connection and communication with a remote computer, such as a laptop, a handheld device, a network station, or some other suitable device. Connection of the device 10 to a remote computer allows for transfer of recorded event data (and other device status) to the remote computer for storage and analysis. In addition to transfer of data from the device 10 to the remote computer, the serial communication interface, in certain optional embodiments, is bi-directional and allows for transfer of device control parameters or other data from the remote computer to the device 10. These control parameters can be used for such things as switching on/off power to device output receptacles.

As depicted in FIG. 1, the device 10 includes a four piece enclosure with a lid, base and two end plates (only front plate is shown), that contains a device circuit board as well as various end-plate mounted components. More specifically, FIG. 1 depicts a cord connected power protection device 10 that includes an input power plug 14 and output power plug 12, two computer network connectors 22, such as CAT-5 or CAT-6 network connectors, two telephone connectors 20, such as RJ-11 connectors, and a display screen 18.

Figure 2:
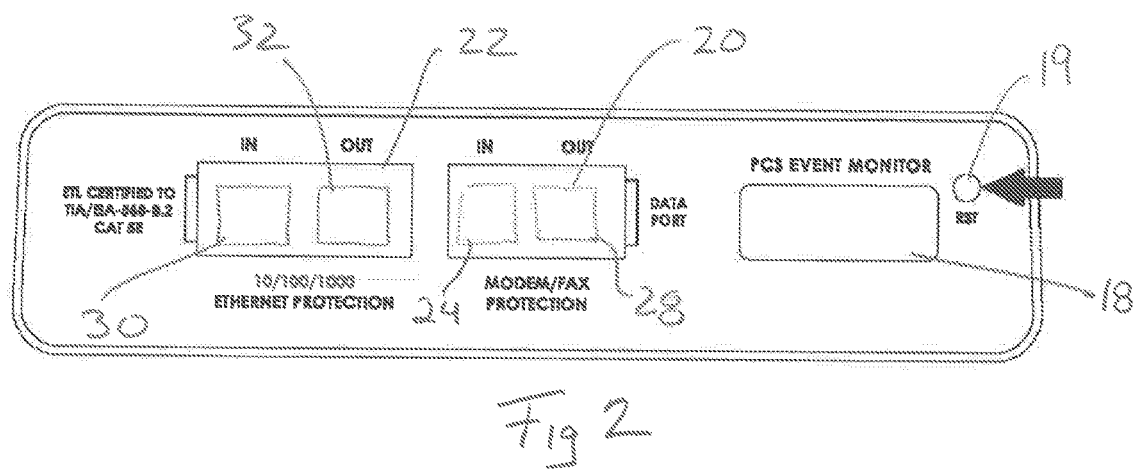
FIG. 2 depicts input and output ports of the cord connected device of FIG. 1.

FIG. 2 depicts in more detail the front panel of the device 10 and shows the telephone connectors 20 as providing two ports, and input port 24 and an output port 28, and the network port 22 as having an input port 30 and an output port 32. In the depicted embodiment, the ports are conventional connection ports of the type typically used for connecting to telephone and Ethernet network wiring. The ports allow for easy coupling of the device 10 to the telephone and computer network wiring, giving ease of use and facile connecting to the technician that is setting up the device 10. The end plate shown in FIG. 2 contains 2×8-pin modular jacks for connector 22 associated with Ethernet circuitry and 2×6-pin modular jacks for connector 20 and associated with telephone circuitry. In addition to the modular jacks, and a display 18 (LCD), the end plate also includes a momentary recessed switch 19. Among other things, the switch 19 may be used to signal the microcontroller to turn on and off power to the device output receptacles and connected equipment. The display 18 is controlled by the microcontroller and is used to display recorded event data and device operational status. The opposite end plate (not shown) of the device 10 would typically include an opening for the AC power cord 14 to enable connection of the device 10 to a circuit outlet, and one or more AC receptacles outlets, in addition to the plug 12, for connection of device 10 to protected equipment.

In one embodiment, the power protection device 10 acts as a current suppression and EMI line filter that protects against current surges and other power-line disturbances (i.e. over-voltages, under-voltages, power outages and branch circuit wiring faults) that can degrade normal equipment operation. Optionally, the device 10 can have over/under voltage circuits that disconnect and protect connected equipment against abnormal line voltage conditions (i.e. over-voltages and under voltages). Still other features and additions can be added without departing from the scope of the invention.

FIG. 3 depicts a functional block diagram 34 of one embodiment of a circuit board suitable for use in the cord power protection device 10. Specifically, FIG. 3 depicts a functional block diagram that includes an input section 36, an output section 38 and a circuit system 51 that sits between the input 36 and output 38. The input section 36 connections, labeled, "line", "neutral" and "gnd" are connected to the AC power cord 14 and the output section 38 connections labeled, "line", "neutral" and "gnd" are connected to one or more output receptacles (not shown) and the outlet cord 12. Between these connections is a circuit system 51 that includes a hybrid filter 52, a microcontroller 112 having a serial communication interface 54, and a telephone circuit 56. The hybrid filter 52 is used to protect connected equipment from power mains disturbances such as transients and EMI. Also shown is a microcontroller 112 that monitors certain inputs and generates certain outputs to control operation of the device 10, including sensing and storing power events. The depicted microcontroller 112 has an on-board serial communication interface (SCI) 56 for connection to/communication with a remote computer. The microcontroller 112 may be any suitable logic device and in one embodiment is the PIC16F1933 or PIC16F1936. In this embodiment, the microcontroller has a built-in serial interface with transmit and receive pins, as shown in FIG. 3. However, in other embodiments, the serial interface may be driven by a separate chip, typically at UART chip, that connects to the microcontroller 112 and operates under the control of the microcontroller 112. In either case, the device 10 can include a serial communication circuit that is suitable for the present operations. As described earlier, this communication interface 54 is used to transfer recorded event data and device status to the computer for storage and analysis. In addition, device control parameters can be transferred from a remote computer to the device.

As can be seen from a review of FIG. 3, the device 10 provides a hardware connector for the serial communication interface 54 by employing two pins of the modular jack 58. Thus, instead of using a dedicated communication interface connector, the device 10 uses the outside four pins of one of the telephone/modem/fax circuitry modular jacks 24 and 28 (as shown in FIG. 2) to provide an electro-mechanical connector. The modular jack 58 shown in FIG. 3 is schematically presented and represents the standard 6-pin telephone jack variety. However, any suitable jack can be used and typically the jack is a registered jack (RJ) having a standardized physical network interface structure for both jack construction and wiring pattern. Typically, the jack is an RJ11, however, other connectors and their wiring may be used such as connectors RJ14, RJ21, and RJ48, or similar.

As shown in FIG. 3, for single pair telephone protection there is one tip/ring pair, and, only two pins of the jack 58 are required in the telephone circuitry. Thus, the input jack 46 can couple to a wall jack that carries the telephone network. At that input jack 46, only two of the six available pins are used as a tip/ring pair, shown as lines 100 and 102 respectively. These two pins couple the tip/ring pair to the telephone circuitry 47 that is a protection circuit for the phone line. The output of that circuit 47 couples the now protected phone line tip/ring pair 106 and 108 to the output modular jack 58. As depicted in FIG. 3, these two protected lines 106 and 108 connect to two of the six pins available through jack 58.

As also shown, the depicted serial communications interface 54 requires the use of two lines, receive line 110 and transmit line 112. These lines 110 and 112, along with power and ground, 114 and 116 respectively, couple from the microcontroller pins, transmit (TX), receive (RX), Vdd (positive supply), and Vss (ground reference). Thus, because the telephone circuit only uses two of the six modular jack pins, the four unused pins of one of the telephone/modem/fax modular jacks may be used as the serial communication interface port. In the depicted embodiment, there is no dedicated special termination circuitry. On the inside, Tx/Rx may be terminated at the appropriate microcontroller (PIC) inputs, and may be protected by two 4.7V Zener diodes to ground. The cable end that plugs into the jack 58 for purpose of communication, may be terminated with an appropriate connector, such as a 6-position RJ-11 male connector, with four positions loaded. Other termination schemes can be used depending upon the length of the cable used and the type of remote computer being connected.

Figure 4:
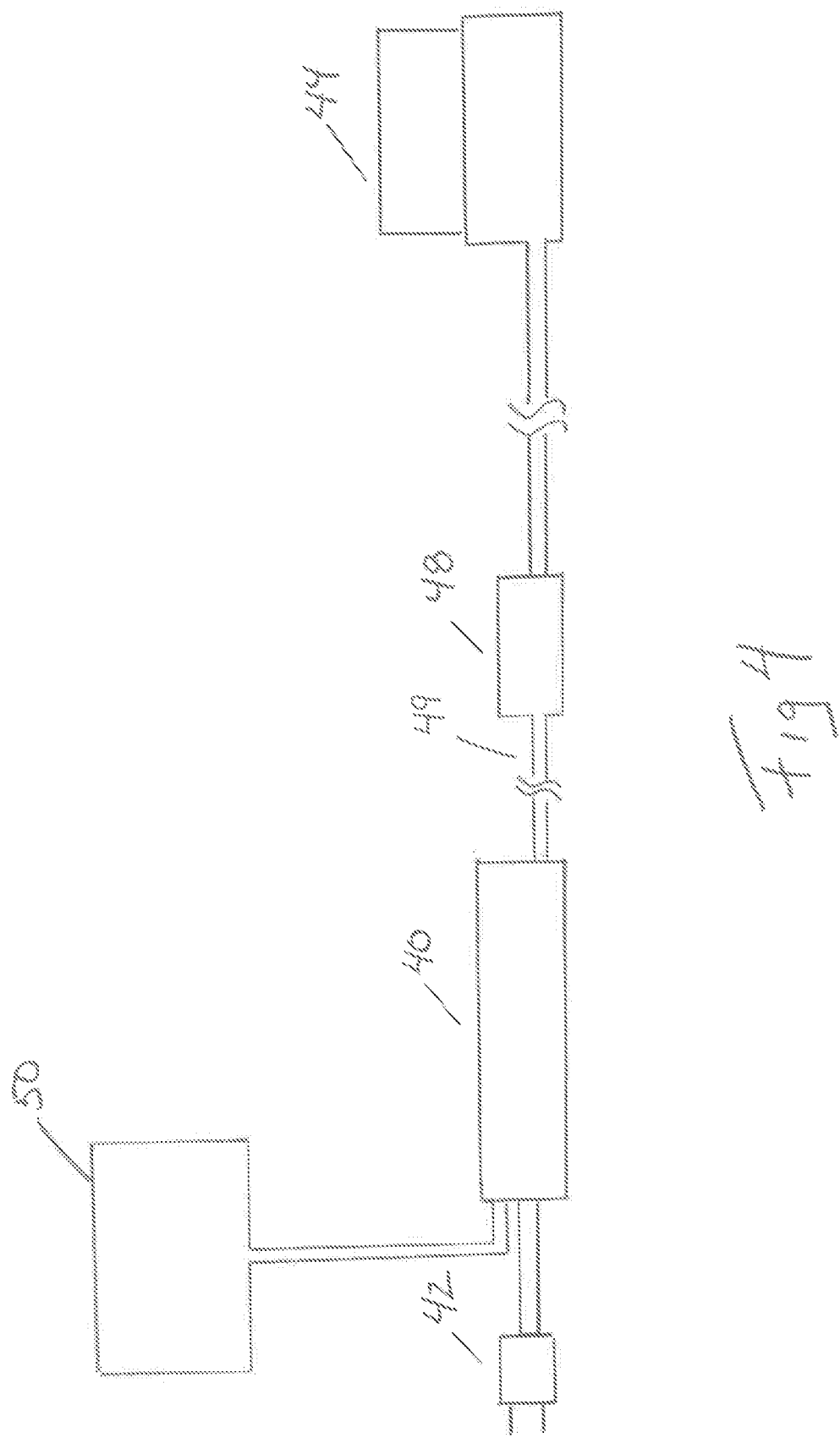
FIG. 4 depicts an example physical interface for coupling the device of FIG. 1 with a remote processor.

The communications interface circuit 56 provides a connection to the portable interface device shown in FIG. 4. This interface allows for downloading of recorded power events such as, over voltage, under voltage, power outage and surge events to a remote processor. Additionally, as described later herein, this interface allows for user/technician selected operating parameters to be transferred to the device 10. Thus, the device 10 can use user-selected operating parameters instead of fixed values for determining over/under-voltage conditions. As there is a wide variety of sensitive equipment that requires power protection and each has a different over-voltage and under-voltage level that can cause operational difficulties, this allows for a user in the field to customize the over and under-voltage levels to be compatible with specific connected equipment.

The cord connected power protection device 10 couples between the wall power socket and the equipment by connecting the input plug 14 into the wall socket and connecting the output plug 12 to the power plug of the equipment. Similarly, the cord connected power protection device 10 couples between a computer network cable and computer equipment and between a telephone line and the equipment by having the input ports 30 and 24 connect to the computer and telephone lines respectively and connects the output ports 32 and 28 to the associated respective equipment. The device 10 can monitor any suitable power configurations, including for example 120 Volt/15 Amp, 120 Volt/20 Amp, 208 Volt/15 Amp, and 208 Volt/20 Amp. Once connected, the cord connected power device 10 monitors characteristics of the power carried by the power line of plug 14, carried by the computer network cable at plug 30 and carried by the telephone network cable at plug 24. Typically, the power characteristic monitored is voltage, but any characteristics can be measured including amperage, frequency, signal to noise ratio or any other characteristic of interest.

In any case, the cord connected power protection device 10 monitors the characteristic and detects the occurrence of power events. These events can include voltage spikes, over voltages, under voltages (brownouts), power outages and voltage sag. The onboard microprocessor 112 with a built in data memory stores an indicator of an event when it is detected. Additionally, the on-board microprocessor 112 monitors a data clock and records at the time of the event the number of cycles the clock has made. This acts as a time stamp that is associated with the recorded event. The microcontroller stores the logged events into the onboard data memory to build an internal database of logged events.

FIG. 4 depicts the device with an established physical communication link made through the output port 28 of the telephone network port 20. Specifically, FIG. 4 depicts a cord connected power protection device 40 that has a wall plug 42, and a removable interface 48 that couples into the dual use connector of the device 40 and between the cord connected protection device 40 and a remote processor 44. In this depicted embodiment, the device 40 has a dual use port, such as the RJ11 modular jack 58 shown in FIG. 3. A technician wishing to communicate with the device 40 disconnects the telephone equipment from the device 40 and connects a cable into the jack 58. Optionally, the technician can disconnect the telephone equipment directly from the jack 58 of device 40, or can disconnect the telephone cable from the telephone equipment and use the cable currently in place and connected to the jack 58 to communicate with the device 40.

In the embodiment depicted in FIG. 4, the cable 49 terminates at one end with a male RJ11 connector. The terminated cable may be USB to TTL serial UArt converter cable having a USB converter circuit 48 that has a USB to serial UArt interface device that handles the USB signaling and protocols. One such device is the TTL to USB serial converter generic cable, part TTL-232RG-VSW5V manufactured and sole by FTDI LTD. Glasgow UK. Also shown in FIG. 4 is the equipment 50 being protected by the cord connected power protection device 40.

The communication link of FIG. 4 allows a user at the remote processor 44 to connect to the cord connected power protection device 40 and to retrieve from the on-board memory the stored data representative of the logged events and the time stamps associated with those logged events. In the depicted embodiment, the cord connected power protector couples between the wall outlet power supply and the equipment being protected 50. As the equipment being protected 50 is often a large piece of equipment, such as a multifunction printer, the cord connected power protector 40 is often placed behind the equipment 50 between that piece of equipment 50 and the wall that has the power outlet to which plug 42 connects. This will put the cord connected power protector in a location that is often inconvenient for a technician to reach. As such, the depicted communication link includes a removable interface 48 that can releasably plug into the cord connected power protection device 40 and plug into the remote processor 44, which typically is a laptop computer. This allows the technician to connect to the cord connected protection device 40 without having to remove it from its location or unplug it from the wall outlet. The depicted remote processor 44 can be any suitable data processing platform such as an IBM PC-compatible computer running the Windows operating systems. Alternatively, the remote processor 44 can comprise a dedicated processing system that includes an embedded programmable data processing system that a technician carries as a diagnostic tool.

As such, the communication interface 48 converts a serial communication data stream received from the cord connected power protection device 40 into a USB protocol communication stream that can exchange data through a USB port on the laptop processor 44. As such, the depicted communication interface 48 allows for bi-directional communication between the remote processor 44 and the cord connected power protection device 40, to allow for receiving instructions from the technician operating the laptop 44 and for transferring recorded events stored within the cord connected power protection device to the laptop processor 44.

The laptop processor 44 depicted in FIG. 4 can include a data interface process capable of collecting event data from the cord connected power protection device 40 and generating an event history as a function of logged events and clock data. The data interface process may be a software process executing on the laptop processor 44 that controls the USB interface process to collect data from the cord connected power protection device 40 and that also generates and operates a user control interface that allows the technician to select certain operating parameters for the cord connected power protector 40 to employ when monitoring the power supply for the equipment 50.

Figure 5:
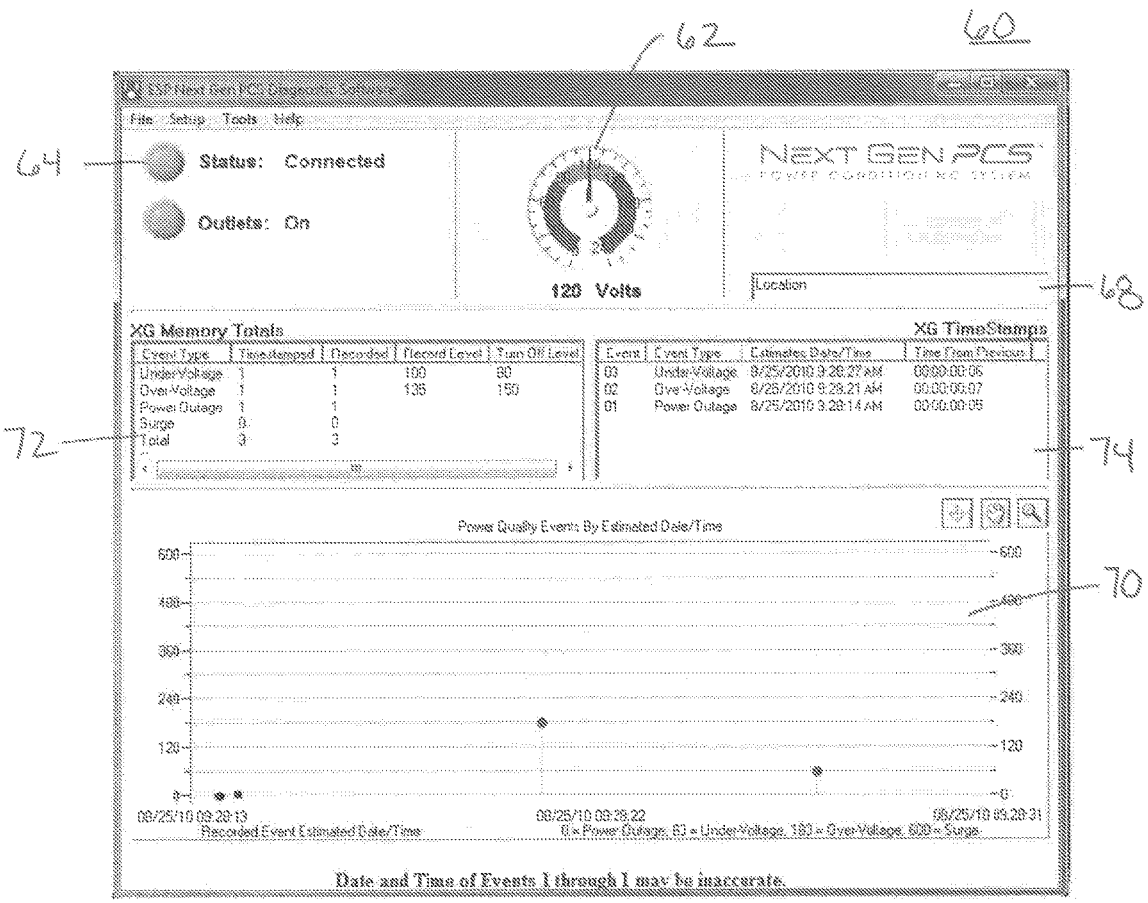
FIG. 5 depicts a user interface for diagnostic software.

FIG. 5 depicts on embodiment of a user interface of a data interface process capable of collecting event data from the cord connected power protection device 40 and generating a time line of power events. Specifically, the depicted data interface process user interface 60 includes a voltmeter graphic 62, a status indicator 64, a location field 68, an event total window 72 and an event time stamp window 74, and a power event time line window 70. The depicted user interface provides the technician with a diagnostic data set that can help the technician determine and establish whether failures and damage to the equipment 50 arises from failure of the equipment or disruptions with the power supply. To this end, the user interface 60 includes a real time voltmeter graphic 62 that provides a real time indication of the voltage levels being provided by the wall outlet power supply. In the depicted embodiment, the voltmeter is biased for a 120 Volt power supply, however, in other embodiments other voltage levels may be depicted. The depicted status indicator 64 is a graphical icon that depicts whether the laptop processor 44 is connected to the cord connected power protection device 40 so that data can be exchanged between the protection device 40 and the laptop processor 44.

Figure 6:
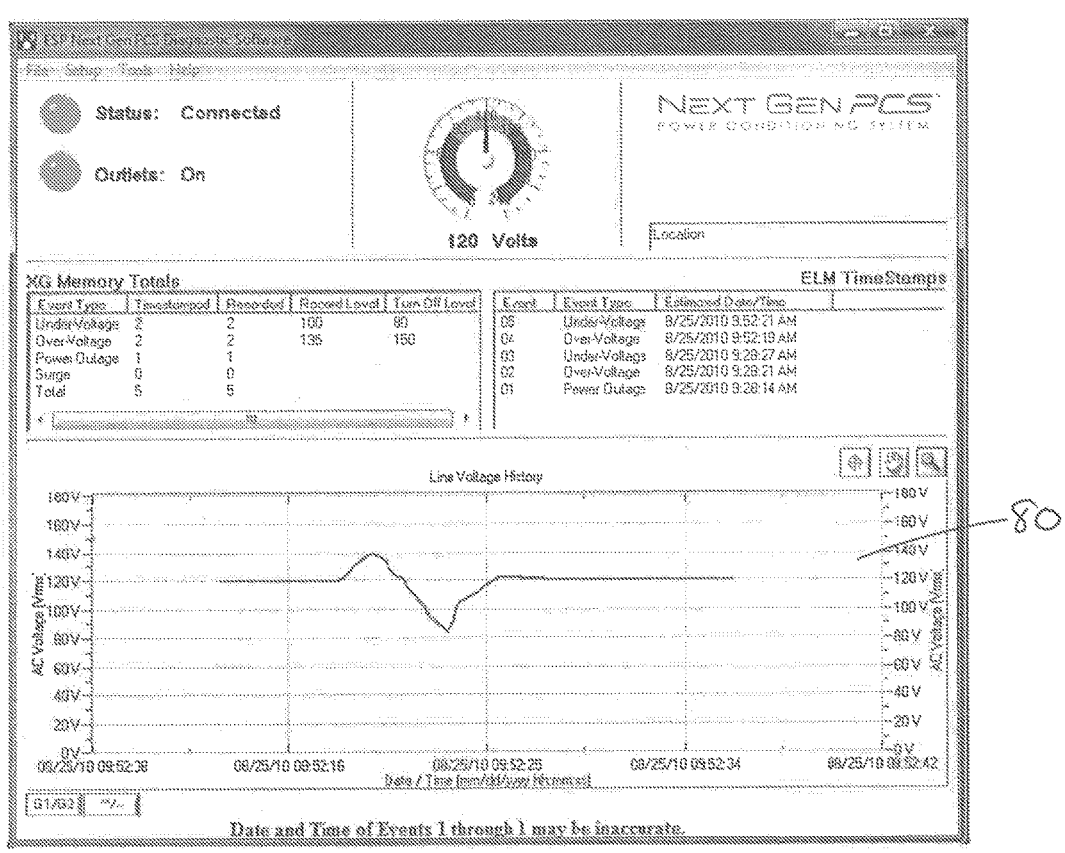
FIG. 6 depicts a user interface showing a line voltage history.

FIG. 6 depicts a further optional feature of the user interface of the data interface process, wherein the data interface process allows the user to select an alternate window to present a history of the power supply line voltage as recorded by the cord connected power protector device 40. Specifically, FIG. 6 depicts the user interface 60 having a line voltage history window 80 that depicts the root mean square voltage measured on the power supply line coming through plug 14. The line history window 80 has an X-axis that sets out time of day data and a Y-Axis that sets out the measured RMS line Voltage. In the history window 80 of FIG. 6 the line voltage history displays to the user/technician that the line voltage surged and dropped at estimated times of around Aug. 8, 2010 at about 9:52 AM. During that period the line voltage swung from about 140 Volts to about 82 Volts. Given this time and voltage history, the technician can diagnose failures and damage of the equipment 50 as results of damaging power supply disruptions.

Figure 7:
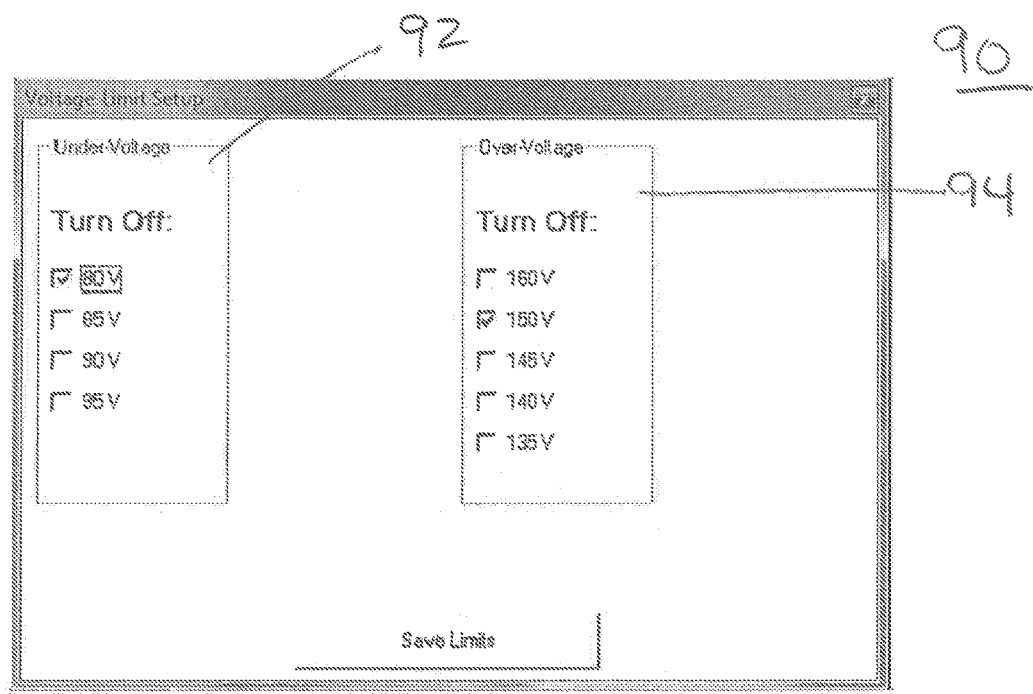
FIG. 7 depicts a user interface control for setting control parameters.

What constitutes a damaging power supply disruption may vary across different types of equipment. To that end, the data interface process executing on the processor 44 may include a device controller process for allowing the user/technician to select an operating parameter for the cord connected power protector device 40 and for communicating that parameter through the communication interface to device 40. FIG. 7 depicts one example of such a device controller process. Specifically, FIG. 7 depicts a user interface screen 90 that may be presented to the user/technician. The screen 90 includes check box menus 92 and 94 that allow the user/technician to select an Under-Voltage parameter and an Over-Voltage parameter. In the depicted screen 90, the values of 80 Volts and 150 Volts have been selected. Once parameters are selected, the user/technician can activate the interface control labeled "Save Limits". In response the device controller process can generate a data package for transmission through the communication interface 48 to the cord connected power protector device 40. The cord connected power protector device 40 can load the new parameters into memory of microcontroller 112 and execute its internal programming responsive to these new parameters.

As discussed above, the cord connected power protection device and the remote processor include processors that can be realized as software components operating on data processing systems, such Windows laptop computer. The processes can be implemented as a C language computer program, or a computer program written in any high level language including C++, Fortran, Java or basic. Additionally, in an embodiment where microcontrollers or DSPs are employed, the processes can be realized as a computer program written in microcode or written in a high level language and compiled down to microcode that can be executed on the platform employed. The development of such systems is known to those of skill in the art, and such techniques are set forth in Digital Signal Processing Applications with the TMS320 Family, Volumes I, II, and III, Texas Instruments (1990). Additionally, general techniques for high level programming are known, and set forth in, for example, Stephen G. Kochan, Programming in C, Hayden Publishing (1983). It is noted that DSPs are particularly suited for implementing signal processing functions, including preprocessing functions such as signal to noise ratio enhancement. Developing code for the DSP and microcontroller systems follows from principles well known in the art.

We claim:

1. An in-line power management system for protecting connected equipment, having:
   in-line power cord, coupled to a housing, for electrically connecting to a wall socket to carry an incoming electrical power signal,
   a power outlet and a telephone jack connector having six connector pins on the housing for providing filtered electrical power signal to equipment connected to the power outlet,
   the housing enclosing:
   a voltage sensor for detecting power events occurring on the incoming electrical power signal,
   an event logger capable of logging an occurrence of a power event to record a type of power event, and
   a communication interface capable of transferring recorded events to a remote processor, the communication interface having
      a connection to two of the connector pins in the telephone jack connector, wherein the two connector pins are unused by telephone equipment, and
      a processor for generating the recorded data as two-line serial communication signals for transferring the recorded events on the two connector pins in the telephone jack connector.

2. The in-line power system of claim 1, wherein the telephone jack connector is an RJ-11 connector.

3. The in-line power system of claim 2, wherein the two connector pins carry a receive line and a transmit line for a serial interface.

4. The in-line power management system of claim 1, further comprising
   a receiver for detecting and processing two-line serial communication signals on the two connector pins and for processing the signals to receive data from a remote source.

5. The in-line power system of claim 1, further comprising
   a clock coupled to the voltage sensor and capable of logging a clock count representative of the time lapsing since a previous logged event.

6. The in-line power system of claim 1, further including a data polling process for interactively collecting data from the event logger and for transmitting collected data in real time.

7. The system of claim 1, wherein the power events include power line transients, voltage spikes, over voltages, under voltages, power outages, voltage sag, or EMI.

8. An in-line power management system for protecting connected equipment, having:
   in-line power cord, coupled to a housing, for electrically connecting to a wall socket to carry an incoming electrical power signal,
   a power outlet and a telephone jack connector having six connector pins on the housing for providing filtered electrical power signal to equipment connected to the power outlet,
   the housing enclosing:
   a voltage sensor for detecting power events occurring on the incoming electrical power signal,
   an event logger capable of logging an occurrence of a power event to record a type of power event,
   a clock capable of logging a clock count representative of the time lapsing since a previous logged event, and
   a communication interface capable of transferring recorded events to a remote processor, the communication interface having
      a connection to two of the connector pins in the telephone jack connector, wherein the two connector pins are unused by telephone equipment, and
      a processor for generating the recorded data as two-line serial communication signals for transferring the recorded events on the two connector pins in the telephone jack connector.

* * * * *